T. KINNEY.
NUT.
APPLICATION FILED MAY 1, 1919.

1,339,113.  Patented May 4, 1920.

Inventor:
Thaddeus Kinney.
By Young & Young
Attorneys.

UNITED STATES PATENT OFFICE.

THADDEUS KINNEY, OF MILWAUKEE, WISCONSIN, ASSIGNOR OF ONE-HALF TO JOHN GARLOCK, OF MILWAUKEE, WISCONSIN.

NUT.

1,339,113.   Specification of Letters Patent.   Patented May 4, 1920.

Application filed May 1, 1919. Serial No. 293,928.

*To all whom it may concern:*

Be it known that I, THADDEUS KINNEY, a citizen of the United States, and resident of Milwaukee, in the county of Milwaukee and State of Wisconsin, have invented certain new and useful Improvements in Nuts; and I do hereby declare that the following is a full, clear, and exact description thereof.

My invention relates broadly to new and useful improvements in nuts, especially those which have particular application to caps for pneumatic tire valves.

It is the principal object of this invention to provide a nut which can be readily slid longitudinally of a bolt or the like having mutilated threads, or operated to rotatably engage said threads.

It is well known that the exposed portion of the valve stem of a pneumatic tire valve is of considerable length and that it requires an appreciable amount of time to thread the protecting cap thereon in the ordinary manner. To allow rapid manipulation of the cap, the same is normally provided with interrupted threaded portions adapted to slidably coöperate with the flat faces or threadless portions of the stem. With this arrangement the cap can only be rotated a portion of a revolution with the threads thereof in coöperation with the threads of the stem so that frequently the proper tight engagement cannot be procured between the end of the cap and the portion of the wheel felly surrounding the stem.

One of the objects of the invention is to so associate the improved nut with a valve cap that the same may either be slid longitudinally of the stem or moved the entire length thereof with the threads of the two parts (the cap and the stem) in coöperative engagement.

A further object is to provide means for selectively holding the movable parts of the cap to procure either of the movements described in the above paragraph.

With these general objects in view, the invention resides in the novel features of construction, combination and arrangement of parts which will be hereinafter more particularly described and claimed, and shown in the drawing in which:

Inasmuch as my invention is especially applicable to the valve structure of pneumatic tires, its use in connection with a cap and valve stem thereof has been illustrated. It is to be understood, however, that the principal feature of the invention, namely the two-part nut having means for increasing the thread area thereof, may be used in various other arts, and many changes may be made therein without departing from the principles of the invention.

Referring to the depicted embodiment of the invention, F indicates the felly of a wheel on which a pneumatic tire T is mounted and through a radial opening O in the former extends a threaded valve stem 1. As is customary in devices of this character, the stem is provided with two longitudinally extending diametrically opposed flattened and threadless portions 2.

Figure 1:
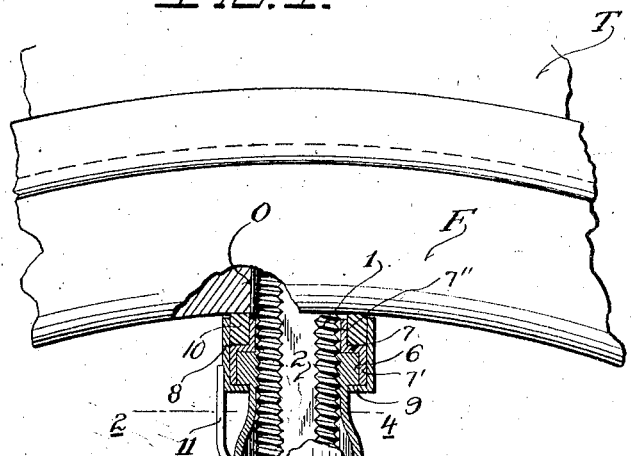
Figure 1 represents a portion of the felly and tire of a wheel and the means for permitting inflation of said tire, said means being partly in section.
Figure 2:
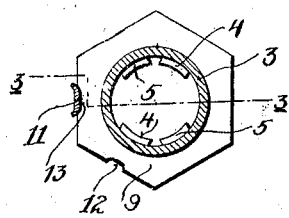
Fig. 2 is a detail transverse section taken on the plane of the line 2—4 of Fig. 1, illustrating particularly the parts of the cap arranged for threaded engagement with the threads of the valve stem.
Figure 4:
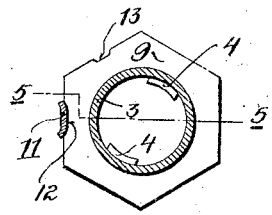
Fig. 4 is a view similar to Fig. 2 and taken on the plane of the line 2—4 of Fig. 1, but showing the parts of the cap arranged to permit the same to slide upon the stem.
Figure 3:
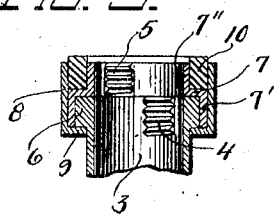
Fig. 3 is a detail sectional view taken approximately on the plane of the line 3—3 of Fig. 2.
Figure 5:
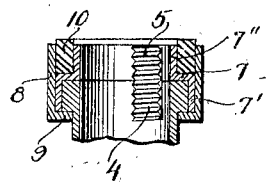
Fig. 5 is a sectional view similar to Fig. 3 and taken on the plane of the line 5—5 of Fig. 4.

Normally the stem 1 is protected by an elongated tubular cap 3; the washer 10 in the inner end of the cap bears against the felly immediately surrounding the opening O. For coöperative engagement with either threads on the stem 1 or the flattened portions 2 thereof, the cap 3 carries an inner thread portion 4 and an outer thread portion 5. When the cap is to be slid longitudinally of the stem for rapid application of the former to the latter, these thread portions 4 and 5 are longitudinally alined as in Figs. 4 and 5. But when the cap is to be rotated on the stem and the threads of the latter coöperatively engaged, the thread portions 4 and 5 are disalined as in Figs. 2 and 3.

It will be noted that there are two diametrically opposed thread portions 4 formed on the inner wall of the cap adjacent its inner end. This inner portion of the cap is also provided with an outwardly extending radial flange 6, which is circular in plan view and receives the similarly shaped end 7' of an inner shouldered collar 7. The shoulder of this collar 7 engages the outer end of the cap and the adjacent side of the flange 6.

The outer end 7" of the collar 7 or that part extending in the opposite direction from the shoulder to the part 7' is of an internal diameter substantially equal to that of the cap 3 and carries a pair of diametrically opposed restricted thread portions 5. The collar 7 is held in position by a retaining collar 8, from the inner end of which extends a radial flange 9 for engagement with the inner side of the flange 6. This collar is substantially polygonal in plan view to permit of the application of the wrench to the cap, and its free end is spaced from the adjacent end 7" of the collar 7 to form a packing seat in which an annular gasket 10 is disposed.

From this description it will be seen that when the cap is to be applied to a threaded stem, the thread portions 4 and 5 are alined by rotating the flange 7, and consequently the flange 8 a predetermined distance in one direction. Since the width of the thread portions 4 and 5 when alined is equal to or slightly less than the width of the threadless portion 2, the cap may readily be slid longitudinally of the stem 1 without interruption. As soon, however, as the collars 7 and 8 are rotated in the reverse direction, the several thread portions 4 and 5 will be disalined as in Figs. 2 and 3, whereupon the thread area of the cap will be considerably wider than the threadless portion of the stem 1 and the only way in which said cap can be moved on said stem is by rotation of the former, as in the case of any ordinary nut. The thread portions 4 and 5 may thus be disalined before the cap is placed over the stem, or after this operation and when the washer of the cap is adjacent the felly F.

As a means for positively holding the thread portions in either their alined or in their disalined positions, I provide the cap with a spring finger 11 adapted to engage in either of two spaced seats 12 and 13 cut or pressed in the edge of the retaining collar 8. From Figs. 2 and 4 it will be noted that when the finger 11 is in the seat 12, the thread portions 4 and 5 are alined and when it is snapped into the other seat 13 said portions are disalined and the thread area doubled in width.

I claim:

1. The combination with a threaded valve stem having a longitudinally extending threadless portion of restricted width, of a cover cap removably disposed over the stem, one end of the cap being closed and the other end open, a thread portion of restricted width on the inner surface of said cap adjacent said open end, a nut member rotatable on said cap adjacent said open end, said nut member having a pair of spaced seats, a thread portion of restricted width on the nut member adapted to be alined with the first mentioned thread portion, said cap being slidable over said valve stem when the thread portions are alined and register with the threadless portions, said nut member being rotatable to shift the thread portions out of alinement, and a spring arm carried by the cap to snap into either of said seats when said nut member is rotated.

2. A device of the class described comprising a tubular element having one end open, an external flange on the element at the open end, a thread portion of restricted width on the inner surface of the element adjacent said open end, a nut member rotatable on said flange and having a part extended beyond the open end of the element, said nut member having a radial flange engaged in the other flange to retain the same on said tubular element, and a thread portion of restricted width on the inner surface of said extended portion of the nut member and adapted to be alined or disalined with the first mentioned thread portion.

3. A device of the class described comprising a tubular element having one end open, an external flange on the element at the open end, a thread portion of restricted width on the inner surface of the element adjacent said open end, a shouldered nut member, the open end of the element and the adjacent portion of the flange being seated against the shoulder of said nut member, the portion of the nut member extended beyond said end of the element having its inner diameter substantially the same as that of the latter, a radial flange carried by the nut member and engaging the inner side of the first mentioned flange to retain the nut member on said element, and a thread portion of restricted width on the inner surface of said extended portion of the nut member adapted to be alined or disalined with the first mentioned thread portion.

4. A device of the class described comprising a tubular element having one end open, an external flange on the element at the open end, a thread portion of restricted width on the inner surface of the element adjacent said open end, and a nut member including a shouldered collar, the shoulder thereof engaging the open end of the element and the adjacent portion of said flange, the larger portion of said collar being in contact with the periphery of said flange, the smaller portion thereof being extended outwardly of the open end of the element and having its inner diameter substantially the same as the inner diameter of the element of the latter, a second collar disposed externally of the first and engaged with the larger portion thereof, a radial flange extending from the second collar and engaged with the inner edge of the first mentioned flange, a packing member disposed between the smaller portion of the first mentioned collar and the corresponding spaced portion of the other collar, and a thread portion of restricted width formed on the inner surface of the smaller portion of the first collar, the same being alined or disalined with the first mentioned thread portion by rotation of the nut member on said element.

In testimony that I claim the foregoing I have hereunto set my hand at Milwaukee, in the county of Milwaukee and State of Wisconsin.

THADDEUS KINNEY.